Nov. 11, 1952        A. O. RYAN        2,617,148
MEANS FOR FORMING FILAMENTARY ARTICLES
Filed Sept. 7, 1950
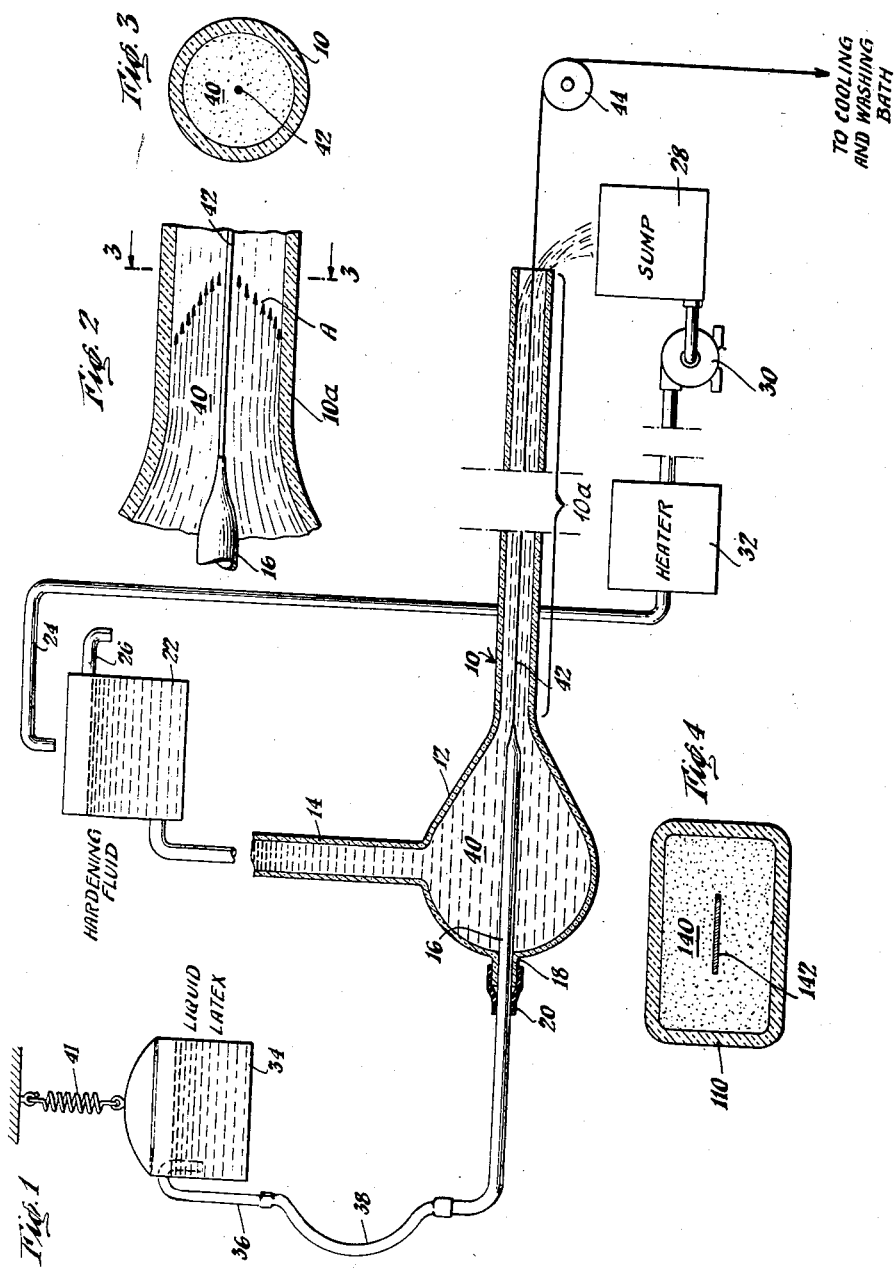
INVENTOR
ALBERT O. RYAN.
BY
Hoag, Kilburn & Carlson.
ATTORNEYS Patented Nov. 11, 1952

2,617,148

UNITED STATES PATENT OFFICE 2,617,148

MEANS FOR FORMING FILAMENTARY ARTICLES

Albert O. Ryan, Norwalk, Conn., assignor to Redding Manufacturing Company, Inc., Norwalk, Conn., a corporation of Delaware Application September 7, 1950, Serial No. 183,597

3 Claims. (Cl. 18—8)

This invention relates to means for forming filamentary articles and, more particularly, to apparatus for the continuous formation of thread-like structures from liquids which may be hardened by a change in temperature, or by physical or chemical reaction. This application is a continuation-in-part of copending application Serial No. 677,972, filed June 20, 1946, now abandoned, which was a division of copending application Serial No. 491,476, filed June 19, 1943, now Patent No. 2,402,846.

An object of this invention is to provide means for forming filamentary articles of high, uniform quality.

Another object of this invention is to provide means for continuously forming threads of uniform cross section from coagulable or solidifiable liquid.

Another object of this invention is to provide means for continuously forming threads of predetermined shape.

A further object of this invention is to provide means for continuously forming threads of filaments without longitudinal tension.

An additional object of this invention is to provide apparatus including as an element thereof a moving stream of liquid flowing with viscous flow, which acts mechanically to confine and transmit shape to a stream of filament forming material and the resultant filament.

A specific object of this invention is directed to novel means for producing latex thread.

These and other objects and advantages of the present invention will become apparent from the following description of a preferred example thereof, illustrated in the accompanying drawings, wherein:

Figure 1 is a schematic view, with certain portions in enlarged cross-section, illustrating a preferred form of apparatus according to the present invention;

Figure 2 is an enlarged, partial cross-sectional view of part of the apparatus illustrated in Figure 1;

Figure 3 is a transverse cross-sectional view taken along the line 3—3 of Figure 2; and Figure 4 is a transverse cross-sectional view showing a modified form of the apparatus illustrated in Figure 2.

In the example illustrated in Figure 1, there is shown a long tube 10 which may be formed of glass or other material suitable for the liquid to be passed through it, and comprising the filament forming portion 10$^a$ which is of uniform diameter throughout its length and to its discharge end, and the larger portion 12. The inner diameter of said portion 10$^a$ of the tube 10 is very small compared to its length, and on the order of 1/8 of an inch. The length of the tube portion 10$^a$ may vary greatly, as for example from 5 to 10 or 20 or even 40 feet and depends upon the time required to coagulate the filament forming fluid.

The tube portion 10$^a$ should have a cross-sectional shape corresponding proportionally to the cross-sectional shape desired of the finished filament since it gives shape to the stream of confining liquid 40 which is part of the filament forming apparatus and is flowed through tube 10$^a$ before the filament forming liquid is introduced, and which serves to transmit the cross-sectional shape of the tube 10$^a$ to the filament forming stream and the resulting filament 42 as they advance through tube portion 10$^a$ together. The confining liquid 40 is thus an element of the apparatus employed for forming the filament.

In the embodiment of the invention shown herein the chamber 12 and the tube 10$^a$ are filled with a confining fluid 40, suitable for the liquid material to be coagulated or solidified, and which is maintained under constant pressure through inlet pipe 14 from a container 22 which is supplied from the conduit 24. In order to maintain a constant head within the container 22, the latter may be formed with an overflow pipe 26 which may discharge any excess fluid back into a sump 28 (through suitable connecting pipes not shown). The confining liquid 40 is pumped into the container 22 through the conduit 24 by means of a pump 30 supplied from the sump 28. If desired its temperature may be controlled by means of any suitable apparatus, indicated at 32.

In the embodiment of the invention shown herein the filament forming liquid is supplied from a suitable container 34 equipped to maintain a constant and uniform pressure, to the discharge end of nozzle 16 in chamber 12, through a siphon 36 and an intermediate connecting hose 38. In order that the flow of the filament forming liquid may be accurately controlled, the container 34 may be suspended by a spring 41 which is so designed that as the filament forming material leaves the container 34 the spring 41 will contract such an amount as to keep the head of the liquid supply constant. Likewise, as more liquid is added to the container 34 from time to time the spring 41 will expand so as to maintain the head in this container constant relatively to the position of the nozzle 16.

In the embodiment of the invention shown in Figure 1 the head of filament forming liquid is maintained constant by means of the movement of the reservoir due to the modulus of the supporting spring. The fluid head may be varied by any suitable device for altering the height of the reservoir while keeping the head of liquid at a fixed level therein, or keeping the reservoir position fixed and altering the liquid level therein, or utilizing a closed reservoir with a device for maintaining a fixed level therein and applying a pneumatic pressure above the liquid surface which can be controlled at will. Replenishment of the filament forming material must be accomplished manually or automatically in each case except for the closed system wherein it must be done automatically in conjunction with a level control device or instrument. Another method to control the flow rate consists of a flow resisting unit or valve. These are generally too costly and unsatisfactory when the filament forming material is natural rubber latex.

The flow resisting element in the filament forming liquid conduit shown in Figure 1 consists of the nozzle 16 the length of which may desirably be from 1 to 4 inches and the bore of which may desirably be from .020 to .080 inch depending upon the size of the mono-filament desired.

The function of the confining liquid 40 as part of the apparatus is in no noticeable way altered or affected by the movement of the thread forming material through tube 10ᵃ. The ratio of area of the filament at the center to the cross-sectional area of the conduit, taking for illustration the cross-sectional area of ⅛ inch which I have usually and successfully employed, is 1 to 17.6 or about 5.7%.

The flow rate of the filament forming material depends largely upon the difference in hydraulic pressure at the inlet to nozzle 16 and the hydraulic pressure of the confining liquid at the exit end of said nozzle, which is the point where the filament enters and is enveloped by the confining liquid, and by varying either pressure the flow rate will vary accordingly. Thus the pressure on the confining liquid governs the speed of filament formation, and the differential pressure of the filament forming liquid relative to the confining liquid pressure controls the filament size. The shape of the filament is controlled solely by the shape of the conduit which is fixed, this shape being transmitted to the filament by the confining liquid 40.

In the application of the apparatus for filament forming it will be understood that confining liquid 40 is caused to flow from the container 22, and fill the chamber 12 and then flow into and through the tube portion 10ᵃ to the sump 28. The tube portion 10ᵃ must be completely full of the confining liquid throughout its length before the filament forming operation is started. With confining liquid 40 flowing through tube portion 10ᵃ, the filament forming liquid to be coagulated or solidified is supplied from the container 34 and flows through the nozzle 16 and is then discharged from the end of the nozzle into the moving stream of confining liquid near the entrance end of tube portion 10ᵃ. In employing the apparatus disclosed herein it is contemplated that the relative pressures of the two liquids in the containers 34 and 22 are such that, as they merge in the chamber 12, preferably just ahead of the entrance to the tube portion 10ᵃ, the two will flow as a single fluid with viscous flow, that is to say, the confining liquid 40 flowing with viscous flow will have its relative velocity slowest at its outer periphery where there is frictional contact with the wall of tube 10ᵃ and fastest at its center, and the filament forming liquid and the resulting filament 42 will flow at the speed of the center of the confining liquid (Figure 2). Thus both liquids will have substantially the same speed at their interface. The liquid to be coagulated or solidified will move along in the center of the confining liquid stream 40 as a continuous enclosed thread-like form which gradually coagulates or solidifies into a solid continuous filament 42. This solid thread or filament passes out from the exit end of the tube portion 10ᵃ without any substantial longitudinal tension having been exerted on it during the forming and hardening steps and may then be passed, as for example over roller 44, to a suitable cooling and washing bath (not shown).

This viscous flow of confining liquid 40 and the filament forming liquid not only prevents the mutual diffusion of miscible liquids or the mixing of non-miscible liquids of low viscosities but it is essential for achieving the object of providing filaments of improved quality in that they are of substantially uniform cross-section and of predetermined shape. Irrespective of the discharge speed of the filament forming liquid from the nozzle 16 the two liquids move together through the tube portion 10ᵃ without subjecting the filament forming material to tension while it is being coagulated or solidified.

Viscous flow in conduits is controlled by the physical dimensions of the conduit and the characteristics of the liquid. For this reason it becomes necessary to consider the liquid as a part of the apparatus. The relationship necessary to maintain viscous flow is expressed mathematically by the "Reynolds number" which is a dimensionless factor indicating the relationship between the physical dimensions of the conduit and the characteristics of the fluid necessary to maintain viscous flow. The Reynolds number is determined by the formula $$\frac{DVd}{v}$$

where $D$ is the diameter of the conduit, $V$ is the velocity, $d$ is the density and $v$ is the viscosity of the fluid. Furthermore, the fluid velocity $V$ through the conduit depends in turn upon the inlet and outlet pressures or, preferably stated, the pressure drop within the conduit and the resistance to flow of the fluid which depends upon the internal diameter of the conduit and its length together with the viscosity of the fluid. Referring to the drawing, the flow rate through the filament forming tube 10ᵃ depends upon the pressure of the confining liquid 40 in the chamber 12 which is the entrance to the tube 10ᵃ, and the pressure at the exit end of tube 10ᵃ which is nil. This differential pressure is the motive force causing flow through the tube 10ᵃ. The wall of tube 10ᵃ offers resistance to flow depending upon its internal diameter, its length, and the viscosity of the confining fluid 40. With the dimensions of tube 10ᵃ fixed, and the viscosity of the fluid fixed by controlling the temperature, the only remaining variable to control in order to control the flow rate is the pressure of the confining fluid 40, which is controlled by the liquid head or its equivalent as explained above.

The control of the flow rate is desirable to provide first, viscous flow of the confining fluid 40, and, second, flexibility in maintaining the desirable velocity through the tube 10ᵃ which is necessary, in conjunction with the length of the conduit 10ᵃ, to establish the time element necessary to allow for the transition of the filament forming liquid to a solid filament while moving continuously and without tension in a space where the shape of the conduit is transmitted to the filament through the confining liquid (see Figures 3 and 4).

The apparatus is applicable for producing threads of any cross-sectional shape, provided only that the inner cross-sectional area of the tube $10^a$ is small and shaped proportionately to the cross-section of the desired thread. In Figure 4, for example, I have shown on an exaggerated scale, a flat thread 142 in a stream 140 of confining liquid contained within a tube 110. The filament forming portion of tube 110 is so proportioned that the speed of the central area of the stream of confining liquid which surrounds the thread 142 is constant and the same as the discharge speed of the filament forming material from the nozzle 16. As will be seen from a study of Figure 2, by way of comparison, this constant area of core of the stream of confining liquid will always be found equally spaced from the inner walls of the container. Thus, if the constant speed core is to have an irregular cross-section, the inner walls of the container must have substantially similar shape. Other forms of thread than that shown in Figures 2, 3, and 4, are, of course, contemplated, and are possible if the forming tube is made of uniform, small diameter and shaped proportionately to the cross-section of the desired thread form.

The limitation of dimensions governing the use of this apparatus is determined by selection of practical values. The tube $10^a$ has two critical dimensions, internal diameter and length. The length of this tube is governed by the material and size of the filament being formed and is indicated by the time in seconds necessary to transform the liquid into a solid filament of sufficient rigidity to prevent deformation under the operating conditions. In the case of natural rubber latex compounds the tube $10^a$ may be as short as 2 or 3 feet, whereas combinations of materials requiring more time may require tube lengths up to 40 feet or more and relative slow velocities of flow. Since the pressure drop in tube $10^a$ is proportional to its length, this pressure drop may be a limiting factor. However, the increased pressure drop can be offset by increasing the internal diameter of a tube $10^a$ within the operative range of diameters.

The inside diameter is selected to provide a suitable practical balance between the flow rate, viscosity of the confining liquid and the pressure drop. The lower limit is controlled only by the ability to keep the tube clean. In the formation of latex rubber threads a $\frac{1}{16}$ inch tube has been used on the finer sizes, 100 to 200 gage.

For larger sizes of filament, pages 37–50, sizes up to $\frac{1}{4}$ inch have been successfully employed. However, $\frac{1}{8}$ inch diameter is the most practical size when the viscosity of the confining liquid is about 35 centipoises.

I have found that, for forming filaments from materials now available, tubes having an internal diameter on the order of from $\frac{1}{16}$ to $\frac{1}{4}$ inch are desirable, where the tube is of circular cross sections. For best results in forming a round thread, it is desirable that the interfacial tension be as high as possible, but surface tension is not the controlling factor. For shapes other than circular the diameter may be calculated by figuring that it is equal to four times the hydraulic radius, where the hydraulic radius is defined as the ratio of the cross sectional area of the tube divided by its wetted perimeter.

The following examples are given by way of illustration and not for limitation:

1. A rubber thread was formed at the rate of 138 feet per minute in a tube of 0.125 inch I. D., and 10 feet long, using a liquid the viscosity of which was 35 centipoises, and the resulting pressure drop was 13 p. s. i. The Reynolds value or number (Perry, 2nd ed., p. 811) was only 31.70 and thus well within the range of viscous flow as the Reynolds value where the flow is known to change from viscous to turbulent flow is 2100.00. Thus the limit of viscosity for the confining liquid is that value, which, for the given size of the filament forming tube, and for a practical filament forming speed (preferably in the range of 500 to 1000 feet/min.), gives a Reynolds value below 2100.00.

2. As a second example I will mention a relationship which is unsatisfactory. If water, which has a viscosity value of 1.0 centipoise, is utilized as the confining liquid in a tube $10^a$ of 0.125 inch I. D., the apparatus thus provided is unsatisfactory for filament forming because the Reynolds value of this combination is 9700 which is in excess of 2100, the top of the critical range for viscous flow, and the flow of the confining liquid 40 in tube $10^a$ is turbulent preventing the desired condition of filament formation free from tension.

3. As a third example I will indicate how a desired flow rate may be obtained or maintained even where the viscosity of the confining liquid and the internal diameter of the conduit $10^a$ are changed. Thus I may wish to have the same flow rate as in Example 1 but using a tube of modified I. D. If I employ a tube $10^a$ having an I. D. of $\frac{1}{16}$ inch instead of $\frac{1}{8}$ inch, for example, I change the viscosity of the confining liquid 40 from 35 to 219 centipoises, which is the viscosity needed to maintain the same identical operating rates and conditions as in Example 1, this relation being controlled by the formula, which as given by Perry's Chem. Eng. Handbook, 22nd ed., p. 819, and assuming a vertical tube $10^a$, is as follows:

$$w = \frac{\pi d^4}{128}\left[\frac{dgc}{u}\left(d \sin a - \frac{P_1 - P_2}{L}\right)\right]$$
$$= \frac{D^4}{v}K$$

therefore $$\frac{D^4}{v} = w = \frac{D^4_2}{v_2}$$

where $w$ = weight rate of flow lbs./second
$D$ = diameter in feet
$d$ = density (lbs./cu. ft.)
$gc$ = accel. due to gravity = 32.2 ft./sec.$^2$
$v$ = absolute viscosity $$\frac{\text{lbs. (mass)}}{\text{(ft.)(seconds)}}$$

$a$ = angle between conduit axis and horizontal— 90°
$P_1 P_2$ = upstream and downstream pressure lbs./ft.$^2$
$L$ = length of conduit $10^a$ As another example of apparatus successfully employed in carrying out my invention, it may be mentioned that a tube having an internal diameter of one-eighth of an inch, and with confining liquid flowing therethrough with viscous flow, has been employed in forming thread .027–.0067 of an inch in diameter.

There are numerous liquids available which may be employed as the confining liquid 40, and the choice will depend on two or more factors, including cost, viscosity, hydroscopicity, tendency for changes in properties with change in temperature, ease of removal from filament, corrosiveness, health hazards etc. Among the liquids I have found satisfactory to use as the confining liquid are: water thickened with carboxy methyl cellulose derivative; acid solutions thickened with a suitable thickening agent; salt solutions; glycerine; glycols; glycerine derivatives; castor oil; higher alcohols etc. The only primary requirement is that the viscosity of the confining liquid is such that in a tube of a given small diameter, and at a given pressure it will flow with viscous flow. This requirement is essential to its function as part of the equipment for filament forming and is independent of the other elements of the apparatus.

A secondary requirement depends upon its function as a part of the process for which my apparatus is intended, and, as such, is dependent upon the type of material being hardened and the nature of the changes resulting in this hardening. Natural rubber latex compounds are very quickly coagulated by acids, salts, and, if sensitized, by heat, and, the apparatus for forming filaments from such compounds must include a confining liquid, which, in addition to being viscous, must contain either an acid, or salts, or both, or be heated to a temperature high enough to result in heat coagulation of the filament.

Synthetic rubber or resin latices, except in rare instances, are not coagulable by acids. Instead they are sensitized to concentrated salt solutions and to freezing. Almost no other methods are now available for coagulating them. Even under optimum conditions the coagulation rate is slow and the tube 10$^a$ must be very long, and, in addition to being viscous, the salt concentration must be very high. Sometimes, this concentration is sufficiently high to require a reduction in viscosity which may be accomplished, for example, by the addition of a suitable alcohol.

In those cases where freezing is the only satisfactory method of coagulation, refrigerated liquids of suitable viscosity may be used. Generally the viscosity will be excessive and must be reduced in a suitable manner. The temperature selected will depend upon the heat transfer rate and the effect on viscosity.

In general, once a suitable confining liquid has been determined for the material to be coagulated, the only requirement needed to make it function as part of the equipment is to adjust and maintain the viscosity at a suitable value. When this is done, no other changes are necessary. Replenishment of the material lost is the only requirement thereafter.

The application of the apparatus for the formation of threads from a variety of materials is contemplated. For example, artificial thread-forming resins or plastics may be discharged into a moving stream of material and there condensed, polymerized or chemically interacted, as the case may be. Likewise, with similar suitable apparatus, molten metal may be discharged into a stream of cooling material and carried therealong until it becomes suitably hardened for withdrawal. It will thus be apparent that, in accordance with the principles of my invention, substantially any temperature-hardenable or chemically-hardenable material may be used, provided it is confined and shaped within a suitable medium flowing with viscous flow and therefore free of longitudinal tension; a "temperature-hardenable" liquid may be defined as any liquid, solution or colloid which is in a normally liquid state but which would become hardened or coagulated at an elevated temperature, or, to put it more simply, any liquid which can be changed to a substantially permanent hardened condition by a temperature elevation or depression.

My apparatus may be employed for forming filaments from plastisols which contain thermoplastic resins dispersed in a plasticizer. They may be converted into a continuous filament in my apparatus by exposure to sufficiently high temperature for a suitable time. It is essential, when employing plastisols as the filament forming material, to use a non-miscible liquid with a suitable viscosity at the temperature employed. Molten alloys can be formed in this apparatus by utilizing as an element of the apparatus a confining liquid of suitable viscosity at the temperature needed to solidify the metal filaments.

In the manufacture of artificial textile filaments many starting solutions cannot be quickly and continuously converted into a filament sufficiently strong to support themselves.

In some cases, as for example when using a protein solution as the filament forming material, the solution is coagulated with an acid and hardened with formaldehyde, and a thickening agent is employed to obtain and maintain the suitable viscosity. For the formation of textile filaments from some special solutions, diffusion of the solvent or dilution of the solvent will result in coagulation of the solvents. Diffusion processes are almost, without exception, very slow, and, my apparatus, employing a suitable confining liquid, is well adapted to provide sufficient time for conversion of the liquid to a solid filament.

It will thus be seen that there has been provided by this invention an apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawing is to be interpreted as illustrative and not in a limiting sense.

What I claim is:

1. In apparatus for forming filaments within a stream of confining liquid and without longitudinal tension, a forming tube having an inside diameter on the order of one-eighth of an inch, a conduit for supplying confining liquid to flow through said tube including a chamber of greater cross sectional area than said tube and opening into said tube, and merging with the tube around the entire perimeter of the entrance end of the tube, and an injector to inject a stream of filament forming liquid into the center of said stream of confining liquid, within said tube.

2. In apparatus for forming filaments within a stream of confining liquid and without longitudinal tension, a forming tube having an inside diameter on the order of one-eighth of an inch, means for supplying a stream of confining liquid to flow through said tube, said means comprising, a conduit including a chamber of greater cross sectional area than said tube and opening into said tube, and injector means extending into said chamber and positioned to inject a stream of filament forming liquid into the center of said stream of confining liquid flowing within said tube, said chamber being dimensioned to feed said confining liquid to the tube without turbulence and merging into said tube around its entire perimeter.

3. In apparatus for forming filaments within a stream of confining liquid and without longitudinal tension, a forming tube, having an inside diameter on the order of approximately one-sixteenth to one-fourth of an inch, means for supplying a stream of confining liquid to flow through said tube, said means comprising, a conduit including a chamber of greater cross sectional area than said tube and opening into said tube, and injector means extending into said chamber and positioned to inject a stream of filament forming liquid into the center of said stream of confining liquid flowing within said tube, said chamber being dimensioned to feed said confining liquid to the tube without turbulence and merging into said tube around its entire perimeter.

ALBERT O. RYAN.

REFERENCES CITED

The following references are of record in the file of this patent:

UNITED STATES PATENTS

| Number | Name | Date |
|--------|------|------|
| 838,758 | Thiele | Dec. 18, 1906 |